Patented Apr. 14, 1925.

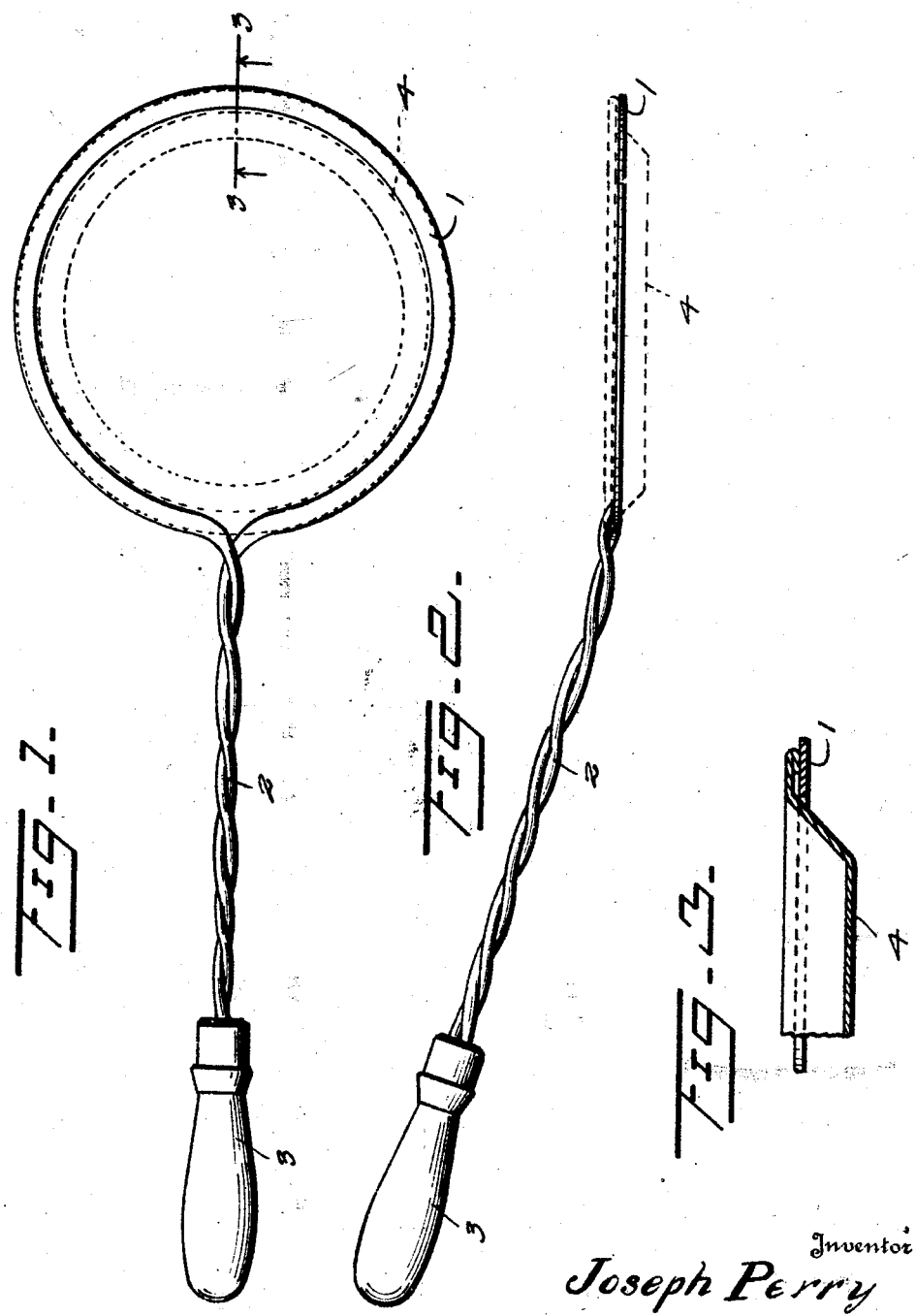

1,533,893

UNITED STATES PATENT OFFICE.

JOSEPH PERRY, OF JACKMAN, MAINE.

PLATE LIFTER.

Application filed October 9, 1924. Serial No. 742,682.

*To all whom it may concern:*

Be it known that I, JOSEPH PERRY, a subject of the King of England, residing at Jackman, in the county of Somerset and State of Maine, have invented certain new and useful Improvements in Plate Lifters; and I do hereby declare the following to be a full, clear, and exact description of the invention, such as will enable others skilled in the art to which it appertains to make and use the same.

The present invention relates to kitchen implements and provides an article particularly adapted for handling hot plates, pans and cooking utensils generally, thereby preventing and chance of burning the hand or arm when placing articles of food in the oven or removing the same therefrom, the device being constructed to readily engage or disengage the pan or plate when removing or place the same in the oven.

The invention provides an article of the nature aforesaid which is neat in appearance, light in structure, and adapted to be easily manipulated and which is durable, strong and effective for the purpose intended and which may be manufactured at a small cost and marketed so as to be within the reach of the average housekeeper.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the specification,

Figure 1 is a top plan view of a kitchen implement embodying the invention, the dotted lines indicating a plate or pan, Figure 2 is a side view of the article, and Figure 3 is an enlarged detail sectional view on the lines 3—3 of Figure 1, the plate or pan being indicated in full lines.

Corresponding and like parts are referred to in the following description and designated in the several view of the drawings by like reference characters.

The device comprises a plate engaging ring 1, a stem 2, and a handle 3. The stem and ring constitute part of a single wire of suitable gauge which is doubled upon itself and enlarged at the bight or fold to provide the ring 1 and having the end portions brought together and twisted together to form the stem 2, which is let into the handle 3. The portion forming the ring 1 is flattened so as to slip easily beneath a plate or pan 4 whereby to be readily disengaged therefrom after the plate or pan has been placed in the oven or to pass easily beneath the plate or pan when engaging the lifter therewith to remove it from the oven. The intertwisting of the end portions of the wire results in the formation of a stout stem 2 besides serving to connect said ends and preserve the outline of the ring 1.

What is claimed is:—

1. A kitchen implement of the character specified comprising a single stout wire doubled upon itself and having the part adjacent the fold or bight enlarged to provide a ring which is flattened, the end portions of the wire being brought together and intertwisted.

2. A kitchen implement of the character specified comprising a single stout wire doubled upon itself and having the part adjacent the fold or bight enlarged to provide a ring which is flattened, the end portions of the wire being brought together and intertwisted to provide a stem to the outer end of which is fitted a handle.

In testimony whereof I affix my signature in presence of two witnesses.

JOSEPH PERRY.

Witnesses:
ARTHUR WARREN ACKER,
HILAIRE BRETON.